(12) United States Patent
Miyakawa et al.

(10) Patent No.: US 6,588,577 B2
(45) Date of Patent: Jul. 8, 2003

(54) SYSTEM FOR CONVEYING CERAMIC SHAPED BODIES AND A RECEIVING PLATE USED THEREFOR

(75) Inventors: Takashi Miyakawa, Nagoya (JP); Yuji Ueda, Nagoya (JP); Satoshi Sugiyama, Nagoya (JP)

(73) Assignee: NGK Insulators, Ltd. (JP)

( * ) Notice: Subject to any disclaimer, the term of this patent is extended or adjusted under 35 U.S.C. 154(b) by 7 days.

(21) Appl. No.: 09/917,219

(22) Filed: Jul. 30, 2001

(65) Prior Publication Data

US 2002/0046925 A1 Apr. 25, 2002

(30) Foreign Application Priority Data

Aug. 1, 2000 (JP) .................................... 2000-232777

(51) Int. Cl.$^7$ .............................................. B65G 37/00
(52) U.S. Cl. ................................ 198/465.1; 198/468.6; 198/781.06
(58) Field of Search ..................... 198/468.6, 465.1, 198/781.06

(56) References Cited

U.S. PATENT DOCUMENTS

| | | | | |
|---|---|---|---|---|
| 2,847,132 A | * | 8/1958 | Wittenberger | 198/468.6 |
| 3,037,608 A | * | 6/1962 | Rothschild | 198/468.6 |
| 3,456,774 A | * | 7/1969 | Blickenderfer et al. | 198/468.6 |
| 3,823,812 A | * | 7/1974 | Sieurin | 198/468.6 |
| 4,010,843 A | * | 3/1977 | Lucas | 198/468.6 |
| 4,505,373 A | * | 3/1985 | Thomas | 198/468.6 |
| 4,865,180 A | * | 9/1989 | Brems et al. | 198/468.6 |
| 5,238,100 A | * | 8/1993 | Rose et al. | 198/468.6 |
| 5,291,986 A | * | 3/1994 | Wheaton | 198/468.6 |
| 6,378,694 B1 | * | 4/2002 | Onoyama et al. | 198/781.06 |

* cited by examiner

Primary Examiner—Joseph E. Valenza
(74) Attorney, Agent, or Firm—Parkhurst & Wendel, L.L.P.

(57) ABSTRACT

In order to prevent deformations, cracks and breakages of thin-walled ceramic honeycomb shaped bodies upon conveying them, a system for conveying such ceramic shaped bodies and cradles used for the system are provided. Since, in the first aspect of the present invention, the cradle 4 is lifted up from the first conveyor path 5-1, transferred to the next conveyor path 5-2 having a different conveying direction from that of the first one while keeping the ceramic shaped bodies 2 lifted, and then put down on the next conveyor path 5-2 when the conveying direction of the cradles 4 on which the ceramic shaped bodies 2 are placed is changed on the way of the conveyor 5, and since, in the second aspect of the present invention, the conveying speed of the cradles 4 on the conveyor 5 is gradually reducing to stop the cradle 4 on the way of the conveyor 5, when the cradles 4 on which the ceramic shaped bodies 2 are placed are stopped on the way of the conveyor 5, the impact on the ceramic shaped bodies 2 can be absorbed in each cases. The cradle 4 consists of an aluminum base 31, a support portion 33 provided on the base 31 and having a receiving portion 32 formed on a side opposed to the side contacting the base 31 in a shape corresponding to the ceramic shaped body 2, and a cushioning material 34 provided to cover the supporting member and the receiving portion 32 of the supporting member 33.

3 Claims, 6 Drawing Sheets

SYSTEM FOR CONVEYING CERAMIC SHAPED BODIES AND A RECEIVING PLATE USED THEREFOR

BACKGROUND OF THE INVENTION

1. Field of the Invention

The present invention relates to a system for conveying ceramic shaped bodies on and along a conveying path in the state that the ceramic shaped bodies are placed on cradles. The present invention also relates to such cradles used for the conveying system.

2. Description of the Related Art

Heretofore, the following process is known as an example of a process for producing ceramic products such as ceramic honeycomb structural bodies. Firstly, ceramic shaped bodies are obtained by molding a ceramic material and cut in a given length. Then, the cut ceramic shaped bodies are individually placed on cradles, and the cradles on which the ceramic shaped bodies are placed are moved along a conveyor path. After that, a given number (for example, five) of the ceramic shaped bodies are aligned and dried, and both end faces of the dried ceramic shaped bodies are cut and finish worked. Finally, the thus finish worked ceramic shaped bodies are fired to obtain ceramic products.

In the above conventional process for producing ceramic honeycomb structural bodies, when the ceramic shaped bodies are placed on the cradles and conveyed, the conveyor path needs, in some cases, to change its conveying direction on the way due to a downstream process layout such as a factory layout or a dryer layout. In this case, it is conventional that the cradles are stopped at a terminal end of a first conveyor path by bumping them against a stopper, and the cradles are pushed to another conveying direction by a plunger or the like to transfer to the next conveyor path. In addition, it is necessary to align two or more ceramic shaped bodies on the conveyor path before entering to the drying step. In this case, also, the cradle is conventionally stopped at the terminal end of the conveyor path by bumping it against a stopper, then the next cradle bumps against the stopped cradle, and this operation continues until the cradles at least required for aligning are acquired.

In the above conventional system for conveying ceramic shaped bodies, when the green ceramic honeycomb shaped bodies are conveyed, shock of bumping upon stopping or changing the conveying direction of the ceramic shaped bodies, or shock caused by the plunger upon pushing is applied on the ceramic shaped bodies. However, even if such a shock is applied, since ceramic honeycomb shaped bodies having a cell-wall thickness of about 150 μm, which are conventionally used, have high strengths, the ceramic honeycomb shaped bodies are not deformed, cracked or broken. Therefore, final ceramic products can be obtained without any problems.

However, thin-walled ceramic honeycomb shaped bodies having a cell-wall thickness of 120 μm or less and a cell density of about 400–1600 cell/sq. in., which have been highly demanded these days, are much weaker than the conventional shaped bodies especially in the green state. Thus, when the thin-walled ceramic honeycomb shaped bodies are conveyed with a conventional system for conveying ceramic shaped bodies, the ceramic shaped body are deformed, cracked or, in an extreme case, even broken with a shock of bumping upon stopping or changing the conveying direction of the ceramic shaped bodies, or a shock caused by the plunger upon pushing. In addition, the strengths of the thin-walled ceramic honeycomb shaped bodies have directionality. It is strong against an impact in the axis direction, relatively strong against an impact in the vertical direction to the cradle as it is supported by the cradle, and extremely weak against an impact in the horizontal direction.

SUMMARY OF THE INVENTION

It is an object of the present invention to solve the aforementioned problems and provide a system for conveying ceramic shaped bodies and cradle used for the system without any deformations, cracks or breakages of the thin-walled ceramic shaped bodies upon conveying.

A first aspect of the system for conveying ceramic shaped bodies according to the present invention is the system for conveying ceramic shaped bodies on and along a conveyor, said system comprising cradles, a conveyor comprising first and second conveyor paths and a conveying direction-changing station, the ceramic shaped bodies being placed on the cradles and the cradles being conveyed on and along the conveyor, wherein a conveying direction of the ceramic shaped body is changed at the conveying direction-changing station while an impact on the ceramic shaped body is absorbed by lifting up the cradle from the first conveyor path, transferring the cradle to the second conveyor path having a different conveying direction from that of the first one while keeping the cradle lifted, and then putting down the cradle on the second conveyor path.

A second aspect of the system for conveying ceramic shaped bodies according to the present invention is the system for conveying ceramic shaped bodies on and along a conveyor, said system comprising cradles and a conveyor, said ceramic shaped bodies being placed on said cradles and said cradles being conveyed on and along said conveyor, wherein the ceramic shaped bodies are stopped while impacts on the ceramic shaped bodies are absorbed by gradually reducing the conveying speed of the cradles on the conveyor to stop the cradle, when the cradles on which the ceramic shaped bodies are to be placed are stopped on the way of the conveyor.

In the aforementioned systems for conveying ceramic shaped bodies, the impact on the ceramic shaped bodies can be absorbed by, according to the first aspect, lifting up the cradle from the first conveyor path, transferring the cradle to the second conveyor path having a different conveying direction from that of the first one while keeping the cradle lifted, and then putting down the cradle on the second conveyor when the conveying directions of the cradles on which the ceramic shaped bodies are placed are changed on the way of the conveyor, or by, according to the second aspect, gradually reducing the conveying speed of the cradles on the conveyor to stop the cradle on the way of the conveyor when the cradles on which the ceramic shaped body placed is stopped on the way of the conveyor. Accordingly, deformations, cracks and breakages of the ceramic shaped bodies during conveying can be prevented.

Further, the cradle used for the system for conveying the ceramic shaped bodies according to the present invention comprises a base preferably made of aluminum, a supporting member provided on the base, preferably made of foamed polystyrene, and having a receiving portion that is formed on a side opposed to the side contacting the base and is shaped corresponding to a shape of the ceramic shaped body, and a cushioning material provided to cover the receiving portion of the supporting member, whereby the cradle is to convey the ceramic shaped body while absorbing an impact on the ceramic shaped body.

In the aforementioned cradles used for conveying ceramic shaped bodies according to the present invention, the ceramic shaped body can be received by the receiving portion of the foamed polystyrene supporting member of the cradle and the cushioning material covering the receiving portion. Therefore, even when a shock is applied on the ceramic shaped body, an impact can be effectively absorbed. In addition, since the ceramic shaped body is held in a state that the cushioning material contacts the ceramic shaped body, the ceramic shaped body can be easily released from the cradle, the supporting member made of the easy-to-break, foamed polystyrene can be prevented from breaking, and thus the cradle can be reused. Moreover, by making the base from aluminum, the entire cradle can be made light and less costly. Furthermore, by making the supporting member from foamed polystyrene, the entire cradle can be made light and less costly to make handling and attaching/detaching easy. As well, since the cradle can be easily worked, even if a diameter of the ceramic shaped body to be held is not the same as being expected due to a difference in shrinking factor, the supporting member can be worked afterward to hold such a ceramic shaped body if the diameter is larger than the expected one. The cushioning material is used for preventing the ceramic shaped body to be held from sliding too much and disturbing a slipping movement due to a large frictional resistance. In addition, the supporting member made of easy-to-break foamed polystyrene may be used in the cradle with the aforementioned configuration, since the cradle contacts the conveyor path via the aluminum base.

BRIEF DESCRIPTION OF THE DRAWINGS

The present invention will be further explained in detail hereinafter with reference to the accompanying drawings, in which.

DETAILED DESCRIPTION OF THE INVENTION

Figure 1:
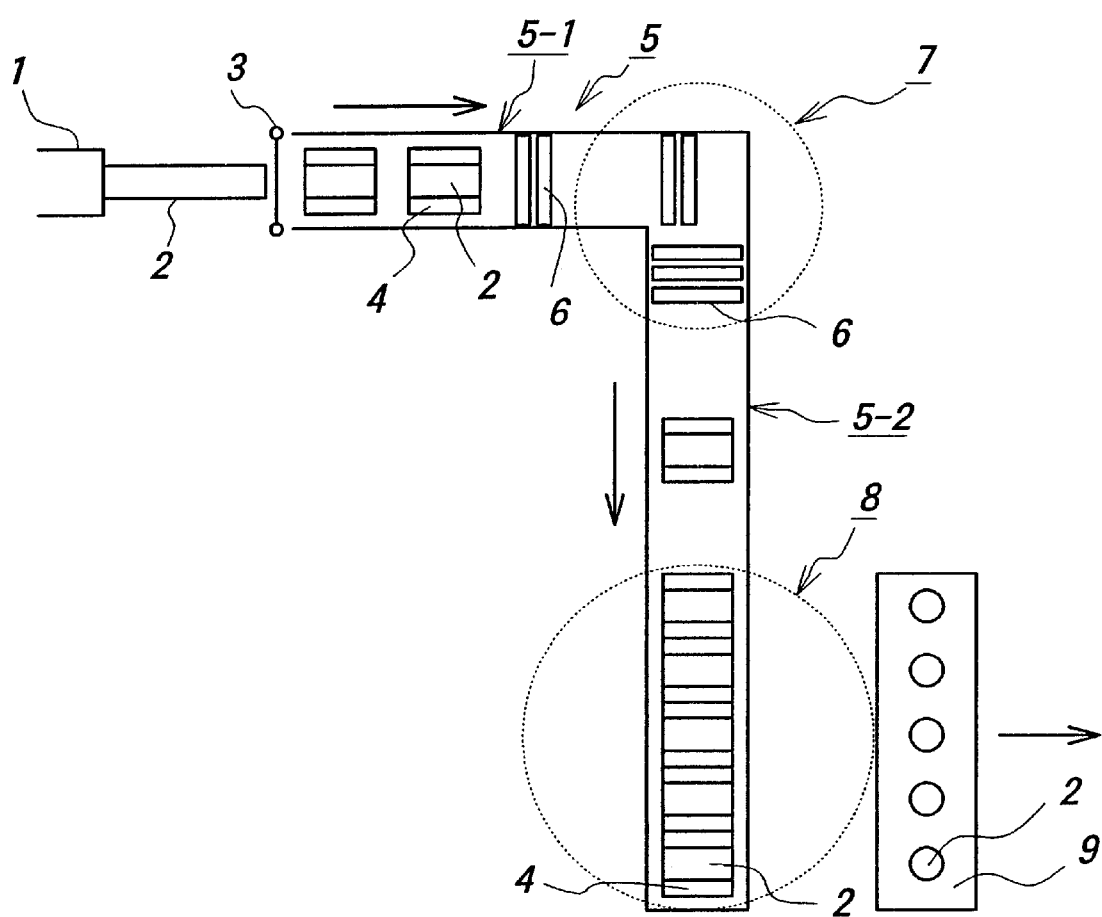
FIG. 1 is a conceptual diagram showing an apparatus including a system for conveying ceramic shaped bodies in accordance with one preferred embodiment of the present invention.

Referring now to the drawings, there is shown in FIG. 1 an apparatus including a system for conveying ceramic shaped bodies in accordance with one preferred embodiment of the present invention. In FIG. 1, a ceramic shaped body 2 formed into, for example, a cylindrical honeycomb shape by an extruder 1 is cut in a given length by a cutter 3. The ceramic shaped bodies 2 thus cut are individually placed on cradles 4. The cradles on which the ceramic shaped body 2 is places are conveyed over on and along conveyor 5.

The conveyor 5 comprises a first conveyor path 5-1 having a given conveying direction and a second conveyor path 5-2 having a different conveying direction from that of the first one (in this figure, the direction is turned 90 degrees from the first conveying direction). Each of the first conveyor path 5-1 and the second conveyor path 5-2 comprises a plurality of self-running conveying rollers 6 of which rotational speed can be regulated by a controller 10 for controlling a not-shown speed-control motor and a not-shown geared motor. A conveying direction-changing station 7 is provided between the first conveyor path 5-1 and the second conveyor path 5-2. At a terminal end of the second conveyor path 5-2, a cradle-aligning station 8 is provided, which aligns and stops a given number (in this figure, five) of the cradles on which the ceramic shaped body 2 is placed at its terminal end.

Figure 2A:
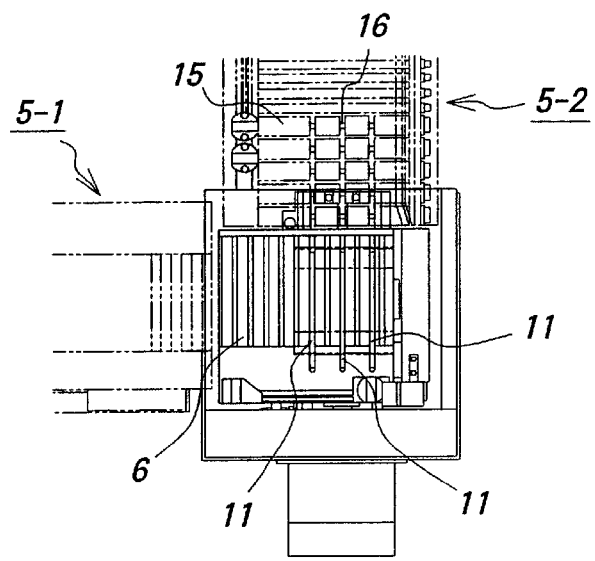
FIGS. 2(a) to 2(c) are sectional views showing a configuration of a conveying direction-changing station in accordance with one embodiment of the first aspect of the present invention.
Figure 2C:
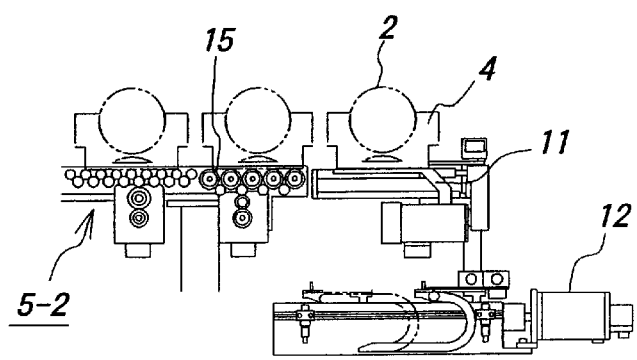
Figure 2B:
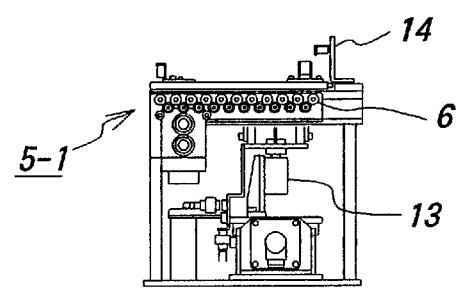
Figure 3A:
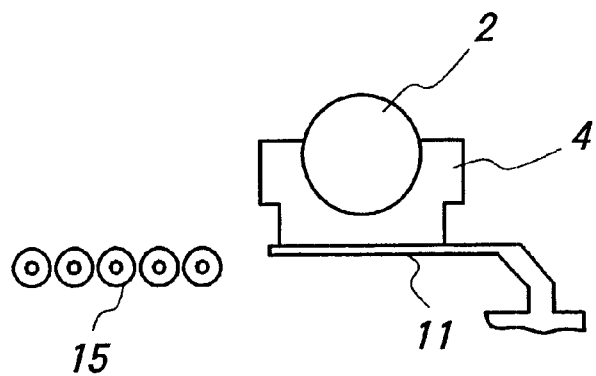
FIGS. 3(a) to 3(e) are figures for illustrating changing the conveying direction of the cradle by a claw member at the conveying direction-changing station.
Figure 3B:
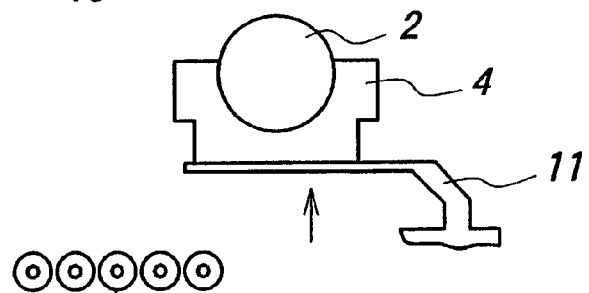
Figure 3C:
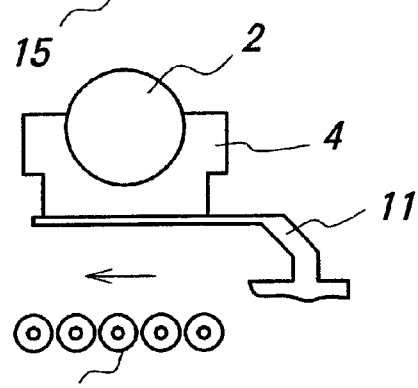
Figure 3D:
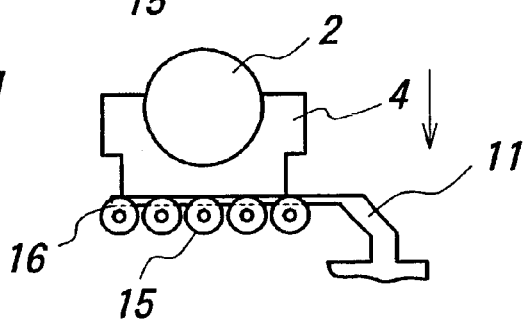
Figure 3E:
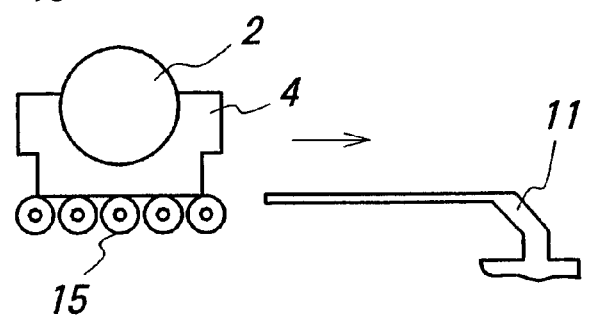

The conveying direction-changing station 7 in the aforementioned system for conveying the ceramic shaped bodies of the present invention will be described now. FIGS. 2(a), 2(b) and 2(c) are a top view, a front view and a side view, respectively, of a configuration of the conveying direction-changing station 7 in accordance with one embodiment of the first aspect of the present invention. In these figures, like elements as shown in FIG. 1 are given like reference numerals, and their description will be omitted. The conveying direction-changing station 7 shown in FIGS. 2(a)–2(c) is characterized in by being adapted to lift up the cradle 4 from the first conveyor path 5-1, transport it to the second conveyor path 5-2 while keeping the cradle lifted, and put it on the second conveyor path 5-2, when the conveying direction of the cradles on which the ceramic shaped body 2 is placed are changed on the way of the conveyor 5, thereby changing the conveying direction of the ceramic shaped body 2 with absorbing an impact on the ceramic shaped body 2.

Specifically, in the conveying direction-changing station 7 which changes the conveying direction of the conveyor 5 from the direction of the first conveyor path 5-1 to the direction of the second conveyor path 5-2, a plurality (in this figure, three) of claw members 11 which are movable in the vertical direction between the conveying rollers 6 as well as in the horizontal direction to the conveying rollers 6 are provided between the conveying rollers 6 of the first conveyor 5-1. In the embodiment as shown in FIGS. 2(a)–2(c), the horizontal movement of the claw members 11 to the conveying rollers 6 is achieved by a servo motor 12, and vertical movement between the conveying rollers 6 by an air cylinder 13.

Referring to FIGS. 2(a)–2(c), steps of changing the conveying direction by the claw member 11 as shown in FIGS. 3(a)–3(e) will be described now. The cradle 4 on which the ceramic shaped body 2 is placed is stopped upon contacting a stopper 14 at the conveying direction-changing station 7 (FIG. 3(a)). Then, the cradle is lifted up from the first conveyor path 5-1 by moving a plurality of the claw members 11 upwardly (FIG. 3(b)). After that, the cradle 4 on which the ceramic shaped body 2 is placed is transported onto the second conveyor 5-2 by moving the plurality of the claw members 11 in parallel to the conveying rollers 6 (FIG. 3(c)). Then the plurality of the claw members are simultaneously lowered and evacuated to an evacuation area 16 provided in the conveying rollers 15 constituting the second conveyor path 5-2 to put the cradle on the second conveyor path 5-2 (FIG. 3(d)). Finally, the claw portion is retracted from the evacuation area 16 to the first position (FIG. 3(e)). In the embodiment shown in FIGS. 2(a)–2(c), the conveying rollers 15 are a part of the conveying rollers 6 constituting the second conveyor path 5-2 existing in the conveying direction-changing station 7. Rollers having evacuation areas 16 in positions corresponding to the positions of the claw members 11 so that the claw members 11 can be evacuated from a conveying plane of the second conveyor path 5-2 are used as the conveying rollers 15.

Figure 4:
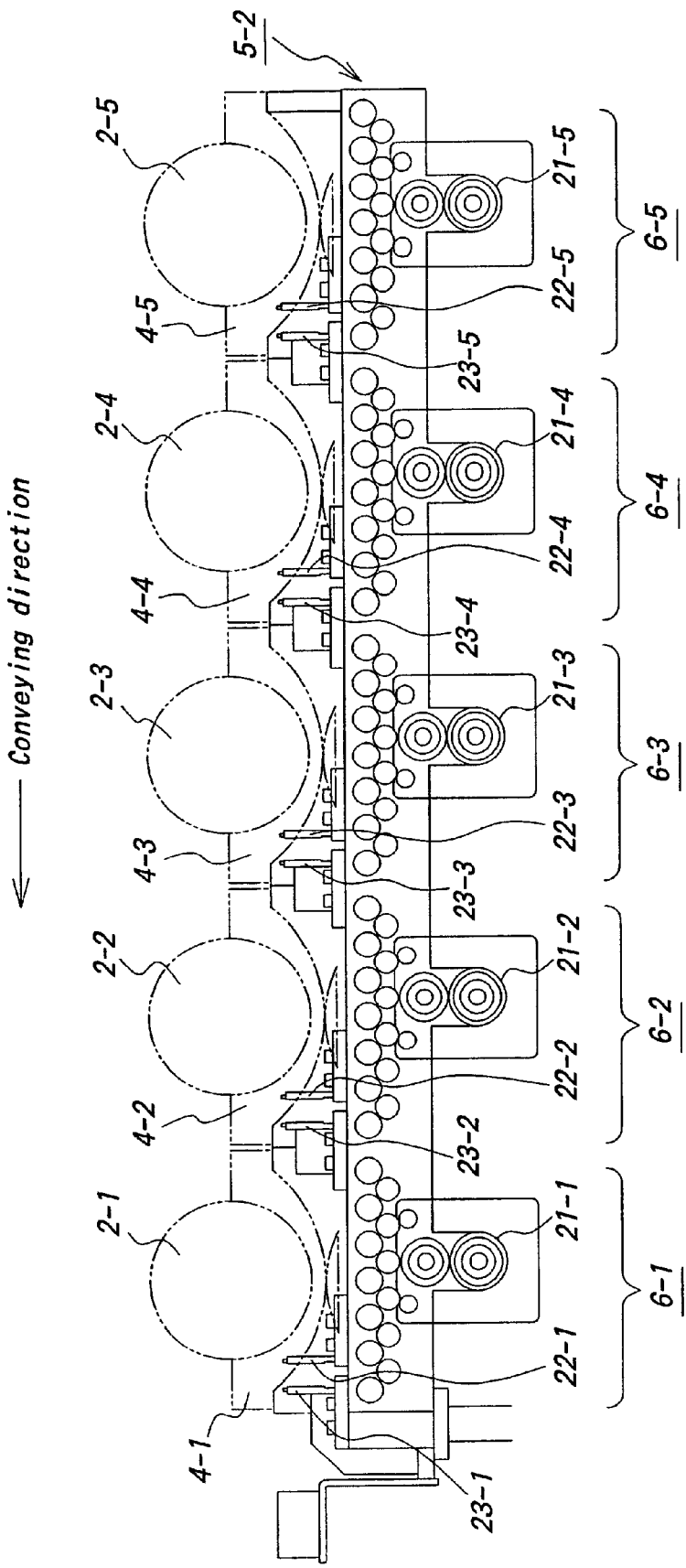
FIG. 4 is a sectional view showing a configuration of a cradle-aligning station in accordance with one preferred embodiment of the second aspect of the present invention.

The cradle-aligning station 8 in the aforementioned system for conveying the ceramic shaped body of the present invention will be described now. FIG. 4 illustrates a configuration of the cradle-aligning station 8 in accordance with one embodiment of the second aspect of the present invention. In this figure, like elements as shown in FIG. 1 are given like reference numerals, and their description will be omitted. The cradle-aligning station 8 shown in FIG. 4 is characterized in that when the cradles on which the ceramic shaped body is placed are stopped at the cradle-aligning station 8, the cradle-aligning station 8 is configured so that the conveying speed of the cradles 4 on the second conveyor 5-2 is gradually reduced to stop, thereby stopping the ceramic shaped body 2 with absorbing an impact on the ceramic shaped body 2.

Specifically, when five cradles 4-1 to 4-5 on which the ceramic shaped bodies 2-1 to 2-5 are respectively placed as shown in FIG. 4 are sequentially stopped to be aligned, among the self-running rollers 6 constituting the cradle-aligning station 8 of the second conveyor path 5-2, the rotational speed of groups of conveying rollers 6-1 to 6-5 each consisting of seven rollers and existing at the places where the cradles 4-1 to 4-5 should be stopped can be regulated by servomotors 21-1 to 21-5 respectively provided therefor, thereby gradually reducing each conveying speed of the cradles 4-1 to 4-5 on which the ceramic shaped bodies 2-1 to 2-5 are respectively placed on the cradle-aligning station 8 to stop.

Figure 5A:
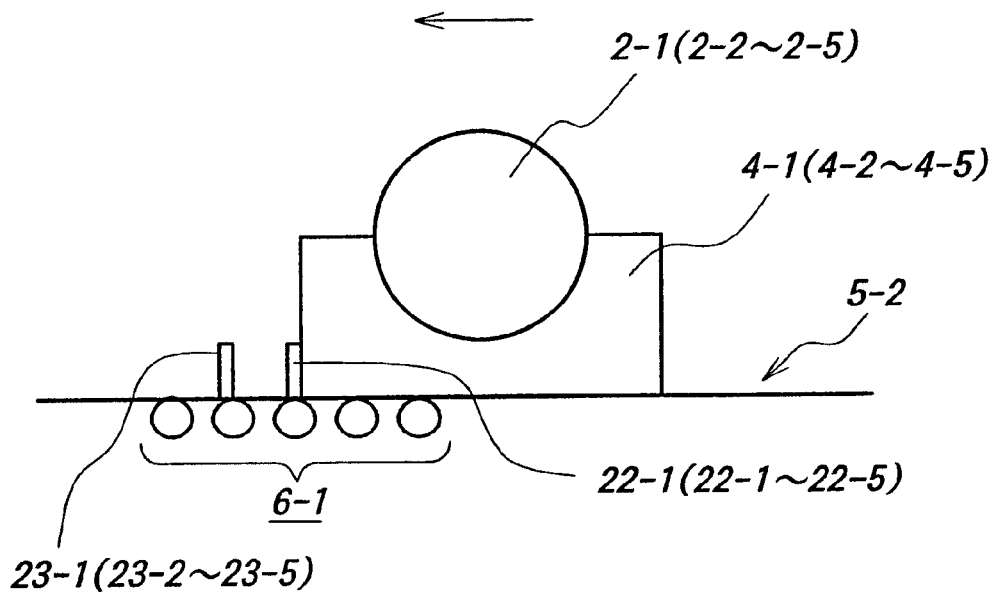
FIGS. 5(a) and 5(b) are figures for illustrating controls in (a) reducing speed of the cradle and (b) stopping the cradle at the cradle-aligning station, respectively.
Figure 5B:
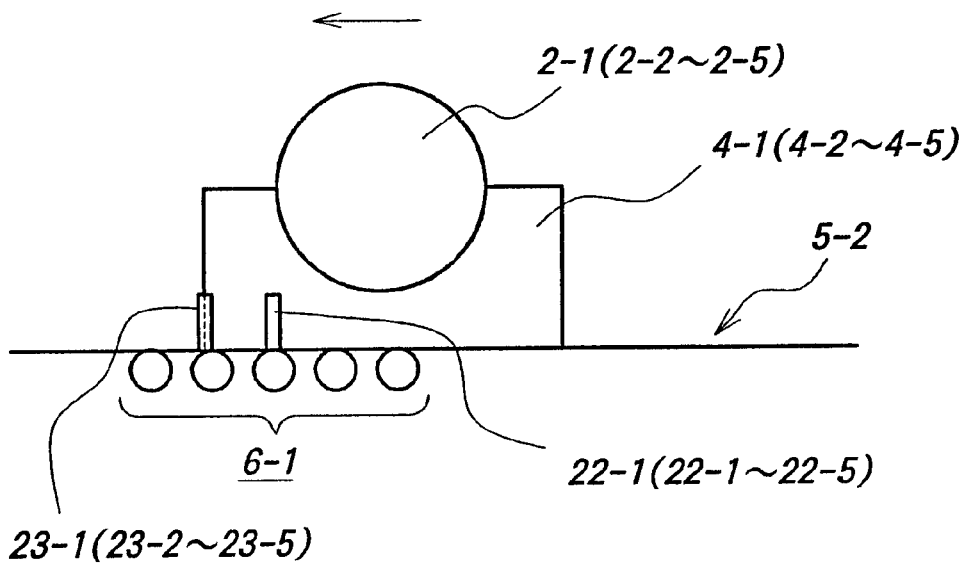

As an example of controlling the rotational speed of groups of the conveying rollers 6-1 to 6-5, when five cradles 4-1 to 4-5 on which the ceramic shaped bodies 2-1 to 2-5 are respectively placed as shown in FIG. 4 are sequentially stopped to be aligned, speed-reducing sensors 22-1 to 22-5 and stopping sensors 23-1 to 23-5 each of which comprises a pair of a light-emitter and a light-collector are provided corresponding to the cradles 4-1 to 4-5, respectively, and on each side of the second conveyor path 5-2. As shown in FIG. 5(a), at a point of time when the cradle 4-1 (4-2 to 4-5) passes over the speed-reducing sensor 22-1 (22-2 to 22-5), the rotational speed of the group of rollers 6-1 (6-2 to 6-5) begins to slow down. At a point of time of the cradle 4-1 (4-2 to 4-5) passes over the stopping sensor 23-1 (23-2 to 23-5), the rotation of the group of the rollers 6-1 (6-2 to 6-5) is stopped.

Each of the aforementioned speed-reducing sensors 22-1 to 22-5 and the stopping sensors 23-1 to 23-5 may be configured in any form as far as the light-emitter and the light-collector are so provided on both sides of the second conveyor path 5-2 that the light-collector may always accept light emitted from the light-emitter when the cradle does not pass over the sensor, and the light-collector does not accept light emitted form the light-emitter when the cradle passes over the sensor, thereby detecting the cradle passing over the sensor.

Figure 6:
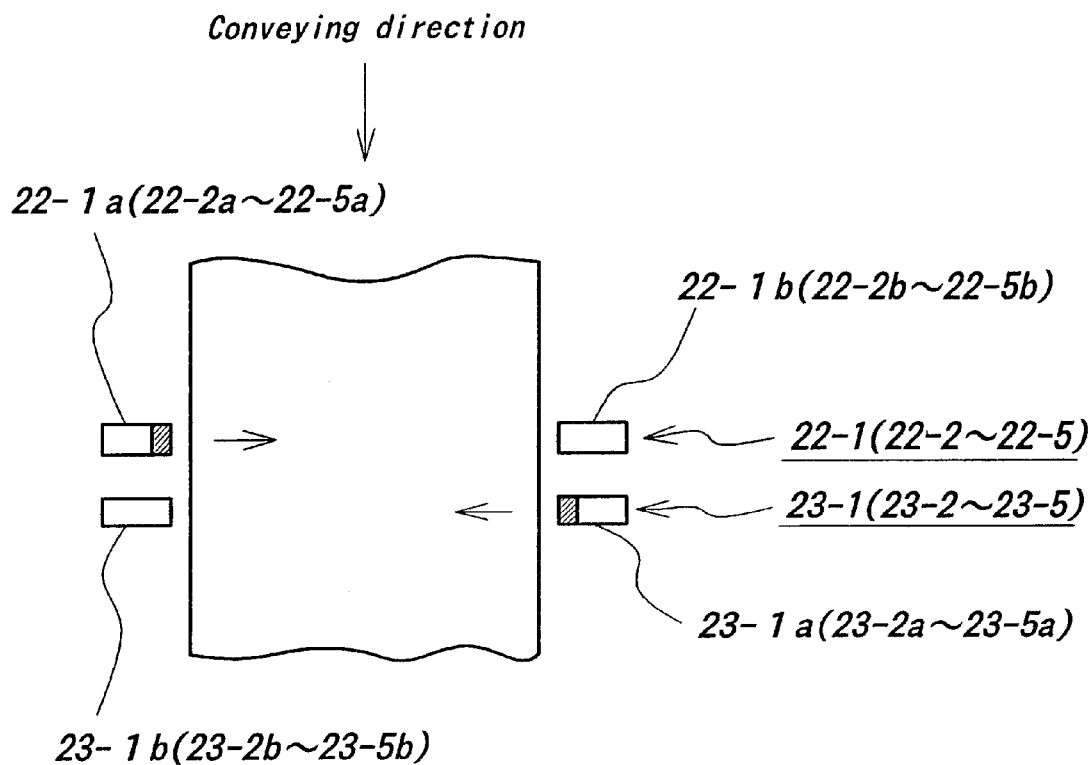
FIG. 6 is a figure showing an arrangement of a speed-reducing sensor and a stopping sensor at the cradle-aligning station by way of example.

However, as shown in FIG. 6, concerning a pair of the speed-reducing sensor 22-1 (22-2 to 22-5) and the stopping sensor 23-1 (23-2 to 23-5) corresponding to the cradle 4-1 (4-2 to 4-5), it is preferable that the light-emitter 22-1a (22-2a to 22-5a) constituting the speed-reducing sensor 22-1 (22-2 to 22-5) and the light-emitter 23-1a (23-2a to 23-5a) constituting the stopping sensor 23-1 (23-2 to 23-5), or light-collectors 22-1b (22-2b to 22-5b) and 23-1b (23-2b to 23-5b) thereof are not placed on the same side of the conveyor path, as the speed-reducing sensor 22-1 (22-2 to 22-5) and the adjacent stopping sensor 23-1 (23-2 to 23-5) may be prevented from malfunctions caused by incoming light from the adjacent light-emitters.

Moreover, in the above example, the pairs of the speed-reducing sensors 22-1 to 22-5 and the stopping sensors 23-1 to 23-5 are provided to be adjacent to a tip of each of the conveying rollers 6-1 to 6-5 as viewed in the conveying direction. The reason of this is to prevent the conveying time from being long since it would take a longer time before the cradles 4 come to a stop at a given point if the cradles start reducing their speeds too early by signals from the speed-reducing sensors 22-1 to 22-5. However, needless to say, the configuration is not limited to the above example as far as the pairs of the speed-reducing sensors 22-1 to 22-5 and the stopping sensors 23-1 to 23-5 are provided along the conveying direction in the order of the speed-reducing sensors 22-1 to 22-5 and the stopping sensors 23-1 to 23-5 in each of the conveying rollers 6-1 to 6-5.

In the aforementioned conveying direction-changing station 7, when the conveying direction is changed from the first conveyor path 5-1 to the second conveyor path 5-2, the cradles 4 on which the ceramic shaped bodies 2 are placed are stopped at the terminal end of the first conveyor path 5-1 upon contacting the stopper 14. This is because the impact caused by a single cradle 4 upon contacting the stopper 14 is considered to be not so large that cracks etc. do not occur in the ceramic shaped bodies placed on the cradles 4. However, in order to effectively prevent the ceramic shaped bodies 2 from occurring the cracks etc., it is preferable that the aforementioned controlling method of the conveying speed of the cradles 4 at the cradle-aligning station 8 is also applied to the conveying direction-changing station 7 where the cradles 4 are stopped at its terminal end. In this case, also, the aforementioned controlling method of the conveying rollers 6-1 with the speed-reducing sensor 22-1 and the stopping sensor 23-1 may be used as well.

In this embodiment, each set of the speed-reducing sensors 22-1 to 22-5, the stopping sensors 23-1 to 23-5, the conveying rollers 6-1 to 6-5 and the servomotors 21-1 to 21-5 is provided for each of the cradles to constitute a speed reduction conveying device of the cradle. When an impact resistance of the thin-walled ceramic shaped body is taken into consideration, an action for loading it to a subsequent drying step should not be too quick to prevent excess acceleration from applying to the ceramic shaped body. Therefore, when productivity is also taken into consideration, it is preferable to load some ceramic shaped bodies in one action. To this end, it is necessary to provide waiting cradles and to apply the speed reduction conveying devices to a waiting station as well. For this reason, though the number of the devices may be changed as needed, it is preferable to adopt the minimum number of the devices for ensuring productivity and the waiting station.

Figure 7:
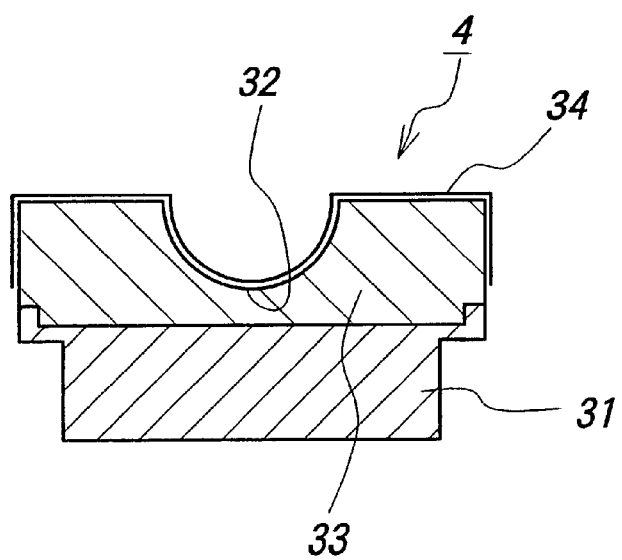
FIG. 7 is a sectional view of a cradle used for placing a ceramic shaped body in the ceramic shaped bodies-conveying system, in accordance with one preferred embodiment of the present invention.

FIG. 7 is a sectional view of the cradle in accordance with one preferred embodiment of the present invention, which is used for the system for conveying ceramic shaped bodies, and on which the ceramic shaped body is placed. In the embodiment shown in FIG. 7, the cradle 4 comprises an aluminum base 31, a foamed polystyrene supporting member 33 provided on the base 31 and a non-woven fabric 34 as a cushioning material. The supporting member 33 has a receiving portion 32 formed on a side opposed to the side contacting the base 31 in a shape corresponding to a shape of the ceramic shaped body 2, for example, in this embodiment, in cylindrical shape. The non-woven fabric 34 is provided to cover the receiving portion 32 of the supporting member 33. By selecting the configuration and the material of each of the aforementioned members to form the cradle 4, the ceramic shaped body 2 can be received by the receiving portion 32 of the foamed polystyrene supporting member 33 and the non-woven fabric 34 covering the receiving portion 32, and an impact can be effectively absorbed by them even if a shock is applied on the cradle 4. Further, since the ceramic shaped body 2 is held in such a state that the non-woven fabric 34 and the ceramic shaped body 2 contact each other, the ceramic shaped body 2 can be easily removed from the cradle 4, and the foamed polystyrene supporting member 33, which is readily damaged, can be prevented from breaking. Therefore, the cradle can be reused.

As having clearly shown in the above description, according to the system for conveying the ceramic shaped bodies of the present invention, since, in the first aspect of the present invention, the cradle is lifted up from the first conveyor path, transferred to the second conveyor path having a different direction while keeping the ceramic shaped bodies lifted, and then put down on the second conveyor path when the conveying directions of the cradles on which the ceramic shaped bodies are placed are changed relative to the conveyor, and since, in the second aspect of the present invention, the conveying speed of the cradles over the conveyor is gradually reduced to stop, the impact on the ceramic shaped bodies can be absorbed to prevent deformations, cracks and breakages of the ceramic shaped bodies upon conveying in each cases.

Moreover, according to the cradle used for the system for conveying the ceramic shaped bodies of the present invention, the ceramic shaped body can be held by the receiving portion of the foamed polystyrene supporting member and the non-woven fabric covering the receiving portion of the cradle, and the impact on the shaped body is effectively absorbed by them even when the shock is applied to the cradle. Furthermore, since the ceramic shaped body is held in such a state that the non-woven fabric and the ceramic shaped body contact each other, the ceramic shaped body can be easily removed from the cradle, and the foamed polystyrene receiving portion, which is readily damaged, can be prevented from breaking, and thus the cradle can be reused.

What is claimed is:

1. A low impact system for conveying soft ceramic shaped bodies on a conveyor, said system comprising:

a plurality of cradles for containing soft ceramic shaped bodies;

a conveyor having conveying rollers for conveying the cradles thereon, the conveyer comprising first and second conveyor paths, the second path being different from the first path;

a conveying direction-changing station comprising lifting means located parallel to, and between, the conveying rollers of the first conveyor path for engaging and lifting the plurality of cradles one at a time at an end of the first conveyor path without the cradle receiving an impact, transporting and lowering the lifted cradle onto the second conveyor path, for minimizing any damage to soft ceramic shaped bodies thereon; and a controller connected to the self-running conveying rollers for controlling rotational speed thereof, wherein the controller gradually reduces to zero a conveying speed of each of the plurality of cradles one at a time at the direction changing station, said speed reduction controlled for minimizing any damage to soft ceramic shaped bodies on a cradle while the conveying speed is reduced to zero.

2. The system for conveying soft ceramic shaped bodies, as recited in claim 1, wherein the first and second conveyor paths comprise self-running conveying rollers and the conveying direction-changing station lifting means comprises a plurality of claw members and a driver for moving the claw members, the claw members located between the conveying rollers of the first conveyor path for moving in vertical and axial directions relative to the conveying rollers, wherein the conveying direction-changing station lifting means is for lifting each of said plurality of cradles one at a time from the first conveyor path by elevating the plurality of claw members, transporting each lifted cradle to the second conveyor path by moving the claw members in parallel to the conveying rollers while keeping the transported cradle lifted, and placing the transported cradle on the second conveyor path by simultaneously lowering and evacuating the plurality of the claw members at an evacuation area provided in the second conveying rollers.

3. The system for conveying soft ceramic shaped bodies as recited in claim 1, further comprises a speed-reducing sensor and a stopping sensor connected to the controller each of which comprises a light-emitter and a light-collector located on respective sides of the conveyor path, the speed-reducing sensor for reducing rotational speed of the conveying rollers when each of the plurality of cradles one at a time passes thereby, and the stopping sensor for stopping the conveying rollers when each of the plurality of cradles one at a time passes thereby.

* * * * *